(12) United States Patent
Mery et al.

(10) Patent No.: US 6,248,237 B1
(45) Date of Patent: Jun. 19, 2001

(54) FILTER ASSEMBLY INCLUDING AN INTEGRAL FILTER CARTRIDGE AND STORAGE POUCH

(75) Inventors: Xavier Mery, Bagneux; Claude Chevallier, Acheres, both of (FR)

(73) Assignee: Societe d'etudes et de Constructions Aero-Navales (FR)

( * ) Notice: Subject to any disclaimer, the term of this patent is extended or adjusted under 35 U.S.C. 154(b) by 0 days.

(21) Appl. No.: 09/359,040

(22) Filed: Jul. 23, 1999

(30) Foreign Application Priority Data

Jul. 27, 1998 (FR) .................................................. 98 09569

(51) Int. Cl.$^7$ .................................................. B01D 35/16
(52) U.S. Cl. .................... 210/234; 210/238; 210/248; 210/447; 210/454; 210/470; 210/484; 55/357
(58) Field of Search ..................................... 210/234, 238, 210/248, 447, 454, 470, 484; 55/356, 357, 385.1; 383/21, 33, 210, 67

(56) References Cited

U.S. PATENT DOCUMENTS

| 3,354,616 | 11/1967 | Lucas ........................................ 55/96 |
| 4,057,406 | 11/1977 | Jansson .............................. 55/385 R |
| 4,882,051 | * 11/1989 | Itoh ...................................... 210/248 |
| 5,837,040 | * 11/1998 | Caughron et al. .................. 55/385.1 |

* cited by examiner

*Primary Examiner*—Matthew O. Savage
(74) *Attorney, Agent, or Firm*—Paul & Paul

(57) ABSTRACT

A filter assembly including an integral filter cartridge and storage pouch is disclosed herein. The storage pouch is configured to hermetically surround the filter cartridge upon removal of the cartridge from an opening of a liquid drainage conduit of the assembly. The drainage conduit can include a shutter for closing the opening of the drainage conduit upon removal of the filter cartridge.

8 Claims, 4 Drawing Sheets

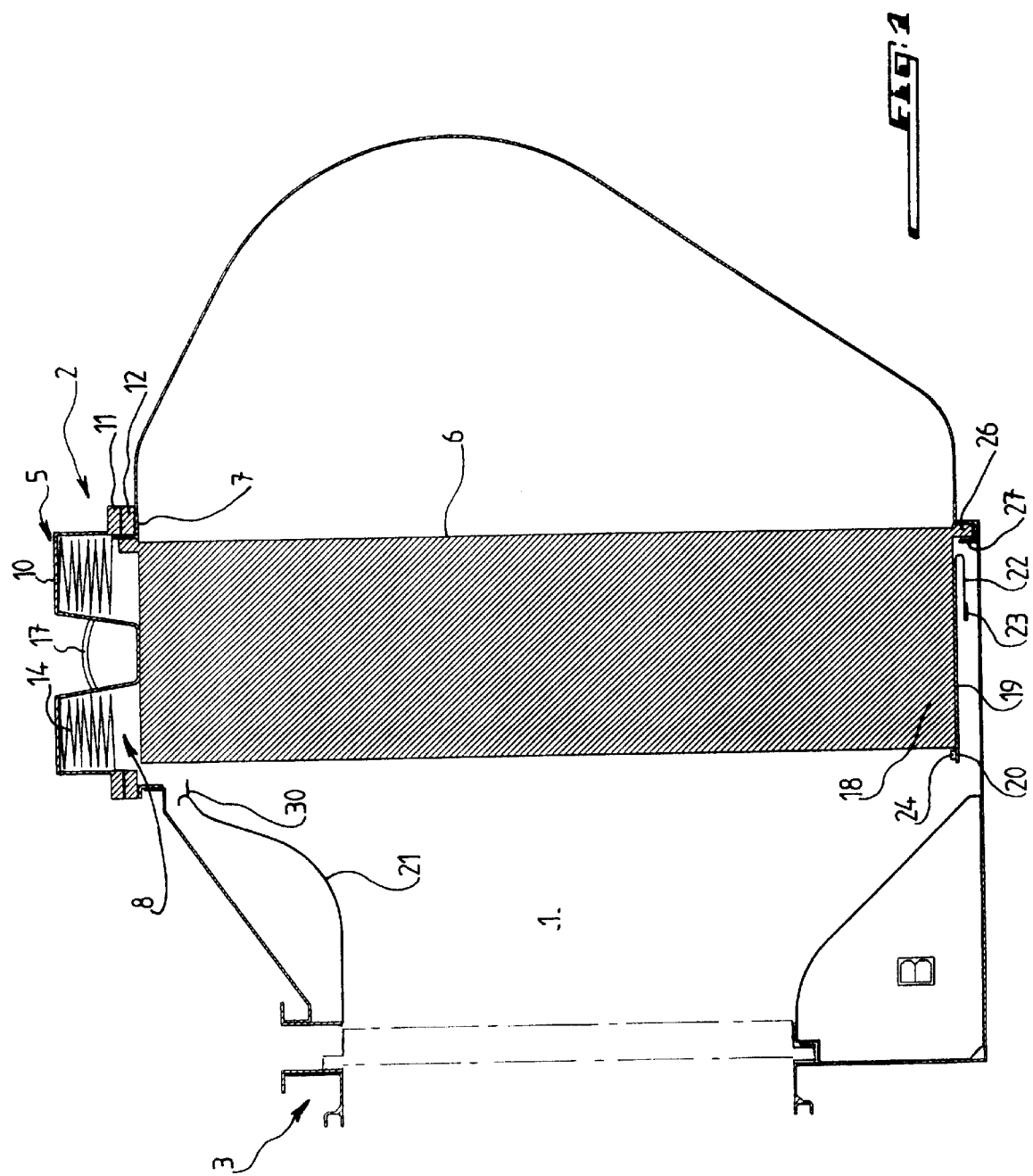

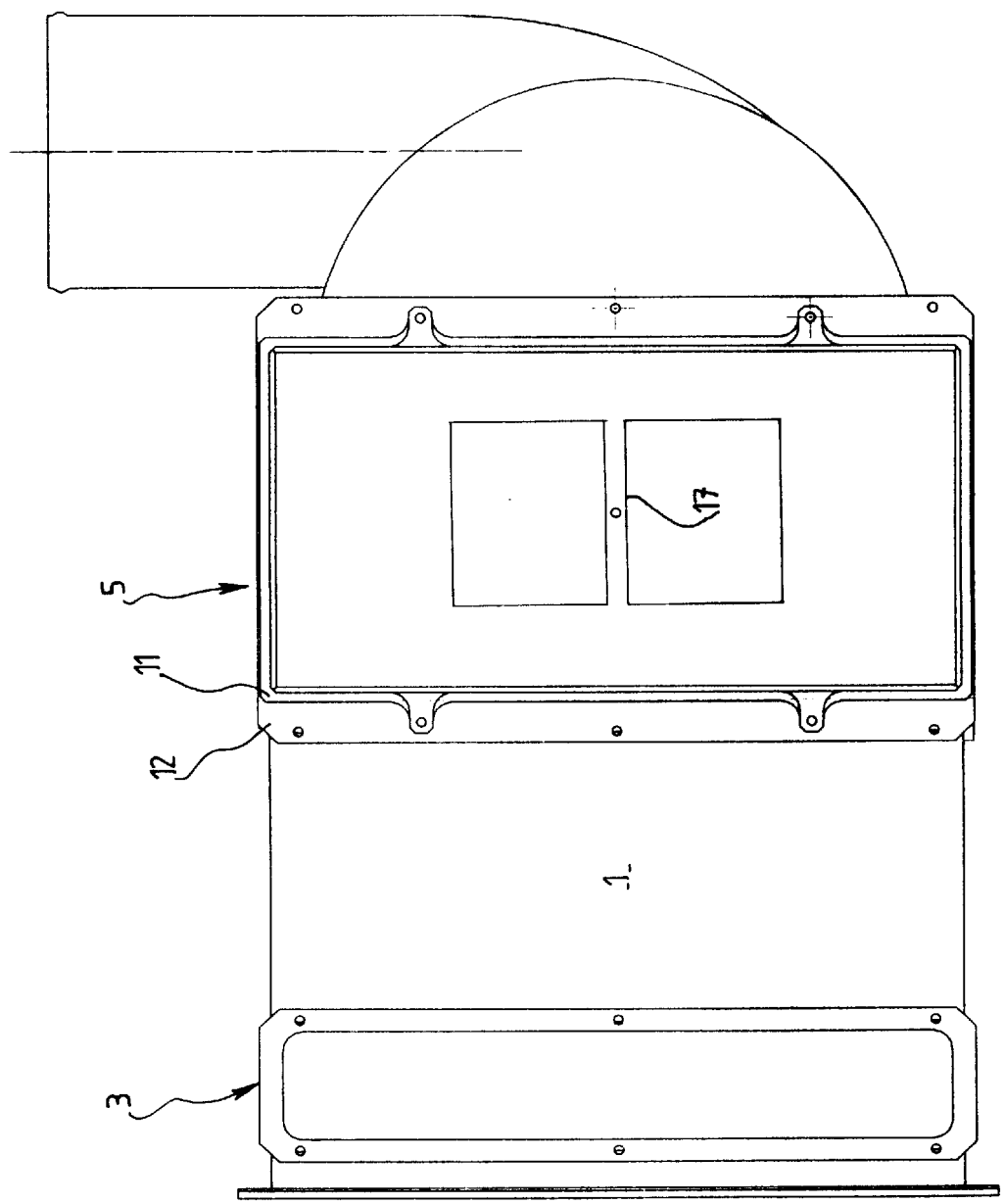

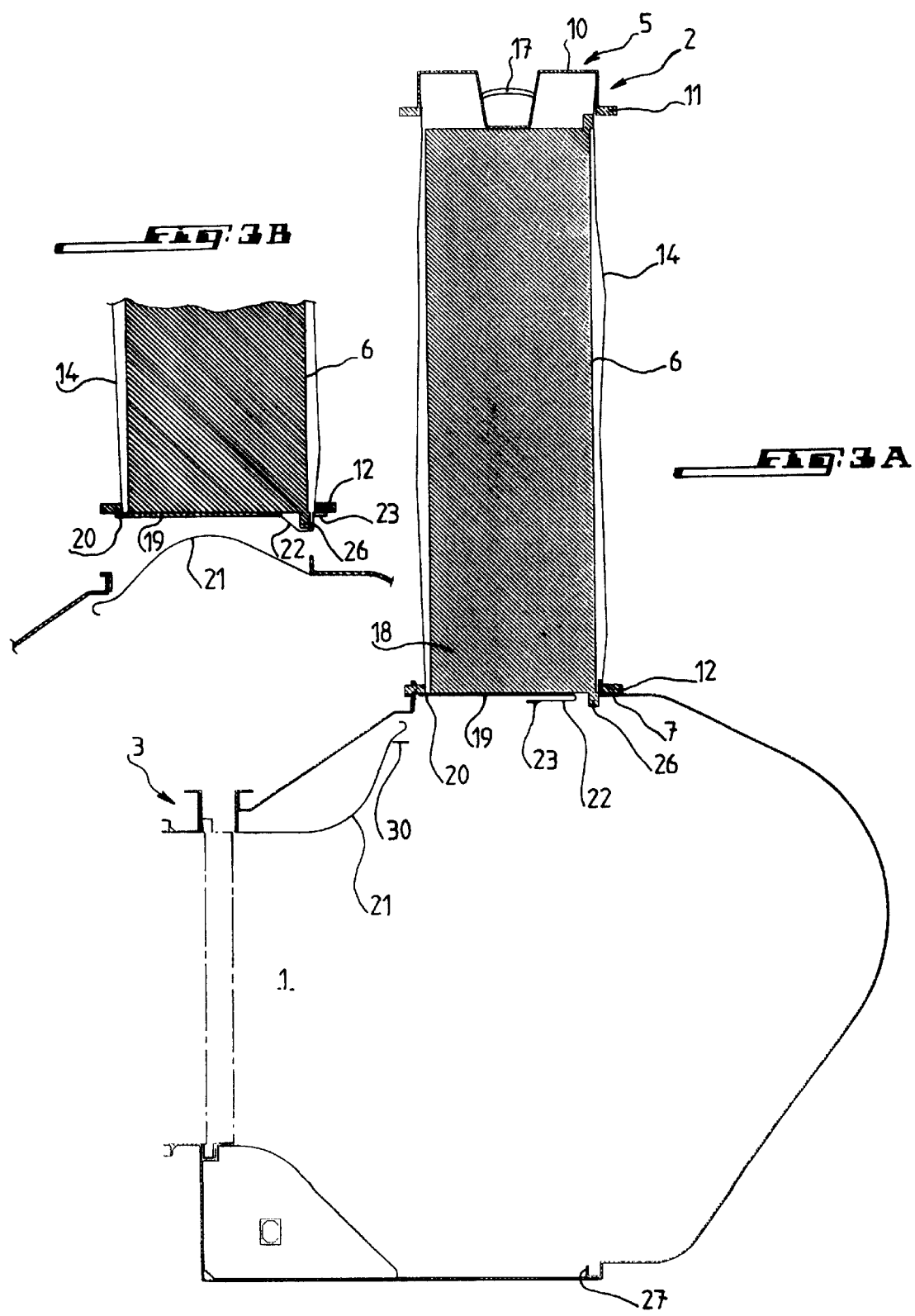

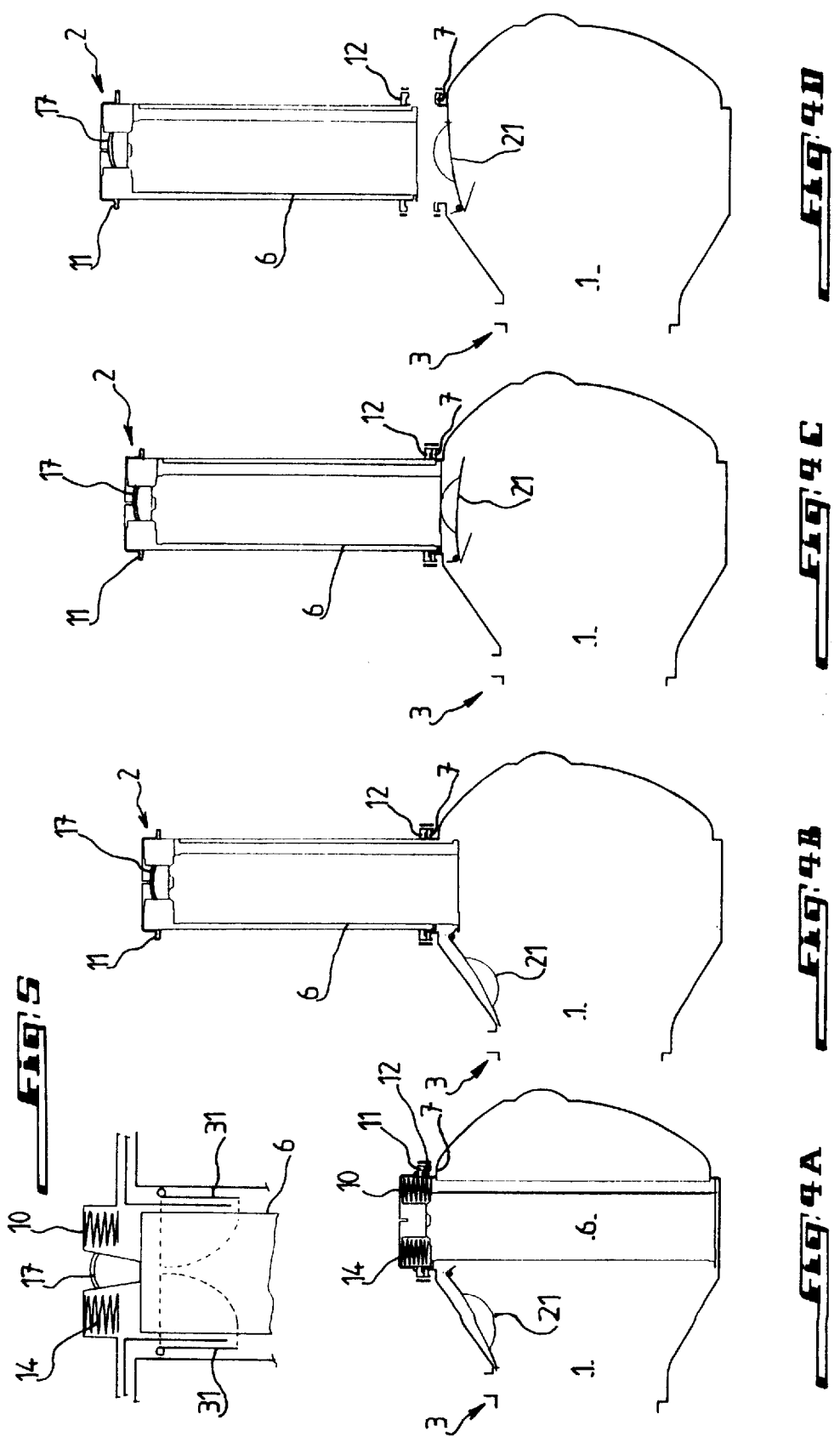

FILTER ASSEMBLY INCLUDING AN INTEGRAL FILTER CARTRIDGE AND STORAGE POUCH

The invention concerns a process for changing a filter cartridge mounted in a liquid drainage conduit that is removable from the conduit through an opening in the wall of the latter, and the design of the filter cartridge to be used in such process.

The disadvantages of known processes and designs of this type include the fact that the replacement process is so time-consuming that either a temporary auxiliary filter must be installed or air circulation must be stopped, which results in pollution of the environment by the materials trapped in the air filter.

The goal of the invention is to provide a process and a filter cartridge design that remedies such disadvantages.

To achieve that goal, the process according to the invention is characterized in that the cartridge is engaged, as it is removed from the conduit, in a closed pouch that is open only at the said [conduit wall] opening.

The design of the filter cartridge used in this process is characterized in that it includes a hood capable of being attached to the rim of the opening for inserting and removing the filter cartridge, and comprising two removable mountable parts, a first upper hollow main part that is joined to the filter cartridge and houses a pouch that is folded up and joined to the bottom of said hood part, and a second hood part to which the other open end of the pouch is attached and which is mounted to and removable from the rim of the opening, the length of the pouch being at least slightly bigger than the size of the cartridge in the direction of the cartridge removal motion.

According to one characteristic of the invention, the design includes a shutter device to open and close the conduit after removal of the cartridge.

According to yet another characteristic of the invention, the part of the cartridge that is opposite the part that is joined to the hood includes means to close the pouch after the cartridge is engaged in it.

The invention will be better understood, and other goals, characteristics, details and advantages will be more clearly understood in the explanatory description that follows with reference to the attached schematic drawings, given by way of example only, illustrating one mode of embodiment of the invention, wherein:

FIG. 1 is an axial cross-section view of a liquid drainage conduit equipped with a filter cartridge design according to the invention;

FIG. 2 is an overhead view of the conduit and the design according to FIG. 1;

FIGS. 3A and 3B are views similar to FIG. 1 but showing the respective design during removal of the filter cartridge and just after its removal;

FIGS. 4A to 4D illustrate the process according to the invention, showing four stages of the filter cartridge removal process;

FIG. 5 is a schematic view of another mode of embodiment of the design according to the invention.

In the figures, reference numbers 1 and 2 designate, respectively, a liquid drainage conduit and a filter cartridge design according to the invention, which is designed to be mounted to so as to be removable from the conduit. Conduit 1 is further provided with means identified by 3, which permit insertion, where necessary, of an auxiliary filter during replacement of a cartridge (6). It should be noted that the use of such an auxiliary filter, which is obligatory depending on the technique, is merely optional in the case of the invention, by virtue of the small amount of time needed to replace one filter cartridge with a new cartridge.

The design of the filter cartridge according to the invention includes hood 5 to which filter cartridge 6 is attached, and which is mounted to so as to be removable from rim 7 on opening 8 provided in conduit 1 for inserting and removing cartridge 6. Hood 5 includes main hood part 10, which is hollow and provided with outer flange 11 surrounding its open end, and a second part 12 also in the form of a flange to which flange 11 may be removably attached, by screws for example, and which includes means permitting its removable assembly on rim 7 of opening 8, also advantageously by means of screws.

As can be seen in FIG. 1 in particular, pouch 14 is housed folded up like an accordion in the bottom of hood 5, more specifically in main hollow part 10 of the latter, around the end of the cartridge. Said pouch is attached by its closed end to the bottom of the hood, and by the edge of its open end 12 so as to be removably attached to rim 7 of conduit 1, as may be seen in FIGS. 3A and 3B in particular. It is further noted that the hood is provided with a device such as a handle, as indicated schematically at 17 to facilitate lifting the hood and removal of filter cartridge 6.

Back end 18 of the filter cartridge is provided with means to tightly seal the pouch when the cartridge exits conduit 1. Such means include a component in the form of plate 19 at the end of the cartridge, which projects laterally on one side to form clip 20 to drive shutter 21 to close opening 8 after removal of cartridge 6, and which has on its opposite side flexible tongue 22 whose length is sufficient to permit pouch 14 to be closed after removal of the cartridge and disassembly from flange 12 on conduit 1, by attaching it to flange 12 as shown in FIG. 3B. Said attachment may be achieved by any suitable manner, by means of Velcro strip 23, for example, provided at the end of tongue 22. Projecting clip 20 also has on its upper surface means 24 to permit it to be fastened to flange 12. Component 24 may also consist of a Velcro strip.

As regards filter cartridge 6, it is noted that its back end 18 is provided with stop 26 to assure the proper positioning of the cartridge when the stop engages with matching groove 27 provided on the bottom of conduit 1.

It should further be noted that when filter cartridge 6 is placed in conduit 1, shutter 21 to close opening 8 occupies a position that is turned toward the back resting against the return means (not shown) as illustrated in FIG. 1. Shutter 21 is blocked in that position until the cartridge is removed and drive clip 20 releases the pivoting of shutter 21, for example by hitting against a release component indicated at 30 and joined to the shutter.

Referring to FIGS. 4A to 4D, the following is a brief description of different stages of the process to remove filter cartridge 6 from conduit 1.

FIG. 4A shows the cartridge in its operating position inside conduit 1. As shown in FIG. 1, main hollow part 10 of hood 5 is attached by its flange 11 to flange 12 of the hood, which is attached for its part to edge 7 of opening 8 of the conduit. To remove the cartridge, flange 11 is detached from flange 12, thereby allowing part of cover 10 to be removed. This detachment permits removal of cartridge 6 from the conduit and deployment of the pouch which, by the fact that its open end is attached to flange 12, hermetically surrounds the cartridge. FIG. 4B illustrates this stage. Shutter 21 is still in its turned back position but its closing pivot is about to be released. FIG. 4C shows the design according to the invention just after the shutter pivots, which under the effect of the return means then rests against back end 18 of the filter cartridge. In FIG. 4D, the cartridge removal operation is finished and the unit formed by hood 5 and cartridge 6 in deployed pouch 14 is separated from conduit 1 after unfastening hood flange 12 from rim 7 of the conduit opening. At this point shutter 21 is blocking the opening.

The operation of inserting a new filter cartridge is performed by reversing the removal operation. This operation is not shown, but it is easy to understand that new cartridge 6 need simply be inserted through opening 8, with pouch 14 folded up in hood 5. Insertion of the cartridge causes shutter 21 to pivot to its withdrawn position. After insertion, flange 12 of hood 5 need merely be fastened to opening rim 7 of conduit 1 in order for the design according to the invention to return to its operating position as represented in FIG. 1.

FIG. 5 shows by way of example a form of embodiment of shutter 21 that is different from the one shown in FIGS. 1 through 4. In this case, the shutter device includes two components 31 placed on opposite sides of the opening, each of which covers half of it. The shutters are driven by cartridge 6, and the shutters are applied against the side faces of the cartridge.

What is claimed is:

1. An apparatus comprising: a filter cartridge mounted in a liquid drainage conduit that is removable from the conduit through an opening in a wall of said conduit, including a hood to close the opening and a pouch in which the filter cartridge is engaged when it is removed from the conduit, the pouch having a first end attached to the hood and a second open end removably attached to a rim of the opening and being folded when the cartridge is inserted in the conduit and deployable during removal of the cartridge, a length of the pouch being greater than a length of the cartridge in a direction of the cartridge's removal motion, wherein the hood includes two removable and attachable parts comprising a first upper main hood part that is joined to the filter cartridge and houses said pouch in a folded state at a bottom of said first hollow upper main hood part, and a second hood part to which the second open end of the pouch is attached, wherein said second hood part is removably secured to the rim of the opening by removable fastening means.

2. The apparatus according to claim 1, wherein said first hollow upper main hood part has a first flange around its open end, the second hood part also comprises a second flange, said first flange being removably attachable to said second flange and said second flange is being capable of being removably fastened to the rim of the opening on the conduit by said removable fastening means.

3. The apparatus according to claim 1, wherein said apparatus includes a shutter device to close the opening in the conduit after removal of the filter cartridge.

4. The apparatus according to claim 3, further comprising a release means for closing the shutter when the filter cartridge is removed.

5. The apparatus according to claim 1, wherein a part of the filter cartridge that is opposite said first upper main hood part includes means to close the pouch after the cartridge is engaged in it.

6. The apparatus according to claim 1, wherein said first hollow upper main hood part includes grasping means, to permit said first hollow upper main hood part to be lifted from the conduit after said first hollow upper main hood part is detached from the second hood part wherein said second hood part remains attached to the rim on said conduit opening.

7. The apparatus according to claim 1, wherein the pouch is designed to unfold during removal of the filter cartridge.

8. The apparatus according to claim 7, wherein the pouch is folded in the first hollow upper main hood part and is deployed during the removal of the cartridge.

\* \* \* \* \*